United States Patent [19]

Van Gils et al.

[11] Patent Number: 4,610,792

[45] Date of Patent: Sep. 9, 1986

[54] MEMBRANE FILTRATION PROCESS

[75] Inventors: Gerard J. Van Gils, Los Angeles, Calif.; Jacob Shorr, Lexington, Mass.

[73] Assignee: Memtek Corporation, Woburn, Mass.

[21] Appl. No.: 691,445

[22] Filed: Jan. 14, 1985

[51] Int. Cl.⁴ .............................................. B01D 13/00
[52] U.S. Cl. .................................... 210/639; 210/650; 210/667; 210/694; 210/778
[58] Field of Search ............... 210/638, 639, 650, 667, 210/669, 694, 712, 723, 726, 778, 805, 806

[56]  References Cited

U.S. PATENT DOCUMENTS

| | | | |
|---|---|---|---|
| 3,870,033 | 3/1975 | Faylor et al. | 210/667 |
| 3,959,129 | 5/1976 | White et al. | 210/667 |
| 3,985,648 | 10/1976 | Casolo | 210/694 |
| 4,246,101 | 1/1981 | Selby | 210/669 |
| 4,414,113 | 11/1983 | La Terra | 210/777 |
| 4,523,999 | 6/1985 | Toyoshi et al. | 210/639 |

Primary Examiner—Ivars Cintins

[57] ABSTRACT

Wastewater is treated with activated carbon, lime, and filter aid, and subjected to membrane filtration to provide water free from suspended solids and having a TOC level less than about 200 mg/l and total solids less than about 2000 mg/l.

12 Claims, 3 Drawing Figures

MEMBRANE FILTRATION PROCESS

FIELD OF INVENTION

This invention relates to membrane filtration systems.

BACKGROUND OF INVENTION

Membrane filtration is widely used to separate high molecular weight materials or fine suspended solids from water or other liquids. Applications include removal of heavy metals from liquid waste of metal processing and finishing operations, recovery of precious metals in the jewelry and photographic film processing industries, and clean up of wastewater for recycling or sewer discharge.

The typical industrial laundry provides clothing, towels, rags and the like to heavy manufacturing, electroplating and automotive industries, battery manufacturers, service industries, newspapers and printers, automobile garages, schools, and a variety of other commercial and retain businesses. When returned to the laundry, these items are contaminated with a range of pollutants, such as oil and greases, heavy metals and solvents. The U.S. Environmental Protection Agency has analyzed laundries and characterized their wastes, finding a general consistency in the types of priority pollutants, but a wide variability in waste concentration from laundry to laundry. Typical pollutant(s) and concentration(s) found in laundry wastewater include TOC (1000 mg/l), BOD (1300 mg/l), COD (5000 mg/l), suspended solids (1000 mg/l), oil and grease (1100 mg/l), lead (4.5 mg/l), zinc (3.0 mg/l), copper (1.7 mg/l), chromium (0.88 mg/l), nickel (0.29 mg/l), chloroform (3.3 mg/l), benzene (2.5 mg/l) perchlorethylene (9.1 mg/l) and toluene (5.2 mg/l).

Conventional treatment systems used for the pretreatment of such wastes prior to discharge to publicly owned treatment works (POTW's) use chemical coagulation and flocculation in conjunction with dissolved air flotation to separate flocculant solids from the water phase, coupled with vacuum filtration to dewater the float solids. These treatment systems are primarily designed to reduce the levels of heavy metals and emulsified oils and greases. Dissolved solids, color materials, and taste and odor compounds generally are not taken into consideration since the system effluent is commonly discharged to a POTW and not reused.

Using typical chemical coagulation and dissolved air flotation systems, wastewater treatment operating costs range from $4.00 to $5.00 per 1000 gallons, with treatment chemicals comprising the largest component costs, e.g., $2.00 to $3.00 per 1000 gallons. Additionally, typical water and sewer costs in 1983 were $0.60 and $0.90, bringing the total water/wastewater operating expense of the laundry operator to approximately $5.00 to $6.00 per thousand gallons.

Due to anticipated yearly increases in water and sewarage rate, and the practice on the part of POTW's to include industrial laundries in point-source programs, it would be highly desirable to provide a system capable of producing product water will be acceptable for discharge into POTW's and, preferably, which can be reused. Such a system should provide for the cost effective removal of colloidal and suspended solids, BOD (Biological Oxygen Demand), COD (Chemical Oxygen Demand), TOC (Total Organic Carbon), color, and odor producing compounds from, reduction of TDS (Total Dissolved Solids) in the wastewater. If the water is to be reused, the system should also result in an effluent containing only a relatively low level of dissolved calcium.

Table 1, below, sets forth typical water quality criteria for POTW discharge and for reuse in an industrial laundry.

TABLE 1

| ITEM | TYPICAL POTW DISCHARGE CRITERIA | RECYCLE CRITERIA |
| --- | --- | --- |
| BOD | 100 mg/l | 30 mg/l |
| COD | usually not limited | 100 mg/l |
| OIL & GREASE | 100 mg/l | 10 mg/l |
| SUSPENDED SOLIDS | 250 mg/l | none allowable |
| LEAD | 1 mg/l | 0.1 mg/l |
| ZINC | 1 mg/l | 0.1 mg/l |
| COPPER | 1 mg/l | 0.1 mg/l |
| CHROMIUM | 1 mg/l | 0.1 mg/l |
| NICKEL | 1 mg/l | 0.1 mg/l |
| CHLOROFORM | 1 mg/l | 0.1 mg/l |
| BENZENE | 1 mg/l | 0.1 mg/l |
| PERCHLORETHYLENE | 1 mg/l | 0.1 mg/l |
| TOLUENE | 1 mg/l | 0.1 mg/l |
| pH | 6–9 | 7–8 |
| HARDNESS | Usually not regulated | 50 mg/l as CaCO3 |
| IDS | Usually not regulated | 2000 mg/l |
| COLOR | Usually not regulated | None allowable |
| ODOR | Usually not regulated | None allowable |

SUMMARY OF INVENTION

A principal objective of the present invention is to provide a membrane filtration process which comprehensively treats heavily soiled wastewater (such as that produced by an industrial laundry), results in product water that is satisfactory for POTW discharge or reuse, and has treatment costs that are lower than existing state-of-the-art wastewater treatment and disposal schemes.

The invention features a process for treating wastewater including a range of contaminants including organic compounds and suspended solids using a series of critical and interrelated steps thereby to remove essentially all suspended solids, reduce TOC to less than about 100 mg/l, and reduce the total solids level to less than about 2000 mg/l, without raising the level of dissolved calcium in the final permeate to unacceptable levels. In the process of the invention, lime is added to and mixed with the wastewater at a concentration of not more than about 2400 mg/l, the wastewater with the lime mixed therein is permitted to settle to precipitate lime with contaminants adsorbed thereon, the settled wastewater is thereafter mixed with a particulate filter aid material at a concentration (wt/wt) of not less than about 0.05%, and the settled wastewater with the filter aid suspended therein is thereafter passed through a membrane filtration unit in which the membrane pores are not less than about an order of magnitude smaller than the diameter of the particles of filter aid material. The filtration unit passes a permeate that is essentially free of suspended solid contaminants, the wastewater including the suspended filter aids is recirculated, and organic contaminants are removed by treating the wastewater with activated carbon, either by using the carbon as the particulate filter aid or by using a bentonite clay particulate aid and passing the permeate from the filtration unit through a carbon column.

In some preferred embodiments, lime is added to the concentration tank at a concentration of between 1200 and 2400 mg/l (and preferably 1800 to 2000 mg/l) or, if mixed with ferric sulfate, at a concentration of about 1000 mg/l lime and 500 mg/l ferric sulfate, and the filter aid concentration is in the range of about 1.0 to 1.5 percent (wt/wt). In other preferred embodiments, carbon dioxide gas is added to the wastewater to be passed to the filtration unit in sufficient concentration (typically a concentration sufficient to adjust the pH to about 10, e.g., about 4–5 cubic feet of $CO_2$ per liter of wastewater) to precipitate dissolved calcium therefrom and reduce the level of dissolved calcium to less than 1 mg/l.

DESCRIPTION OF PREFERRED EMBODIMENT

Figure 1:
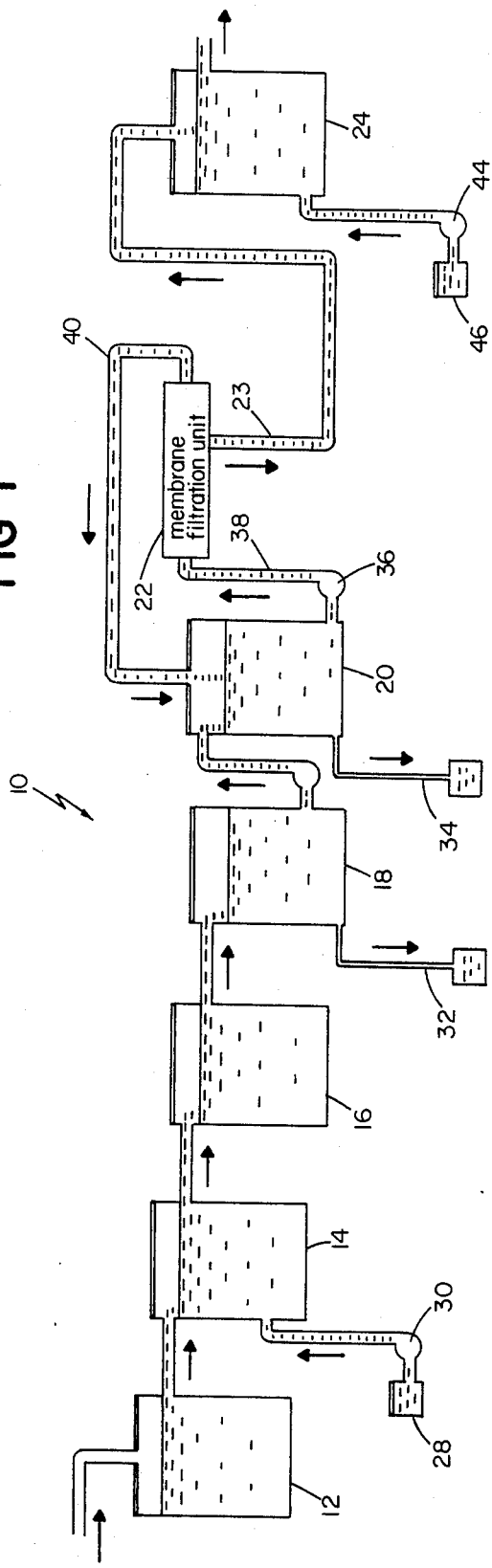
FIG. 1 is a schematic of a filtration system used in the practice of the present invention.

FIG. 1 of the drawings shows a schematic of a filtration system used in the practice of the present invention. The system, generally designated 10, includes a wastewater holding tank 12 which receives wastewater from a laundry, a mixing tank 14 and coagulation tank 16 in which the wastewater is pretreated, a settling tank 18 in which at least a portion of the impurities of the wastewater are removed, a recirculation tank 20 in which a filter aid may be mixed with the pretreated wastewater from tank 18 before it is ultrafiltered, a membrane filtration unit 22 of the type now being manufactured and sold by Memtek Corportion of Woburn, Mass., and a permeate neutralization tank 24 to which the permeate outlet 23 of membrane filtration unit 22 is connected. From permeate neutralization tank 24, the water is either discharged to a POTW or recirculated for reuse.

A chemical pretreatment solution or slurry may be prepared in a premixing tank 28 and forced, by pump 30, into rapid mixing tank 14, in which it is stirred at high speed, e.g., about 90 rpm, for a short period, e.g., about 1 minute. The mixture is then transferred into coagulation tank 16 where it is stirred at a lower speed for a longer time, e.g., at about 20 rpm for about 9 minutes. In some systems, both the rapid and slower mixing may be done in a single tank.

Concentrated sludge may be removed from the bottom of settling tank 18 through drain line 32 and from the bottom of recirculation tank 20 through drain line 34.

A pump 36 mounted in the inlet line 38 from recirculation tank 20 to filtration unit 22 forces wastewater from the recirculation tank through the filtration unit. The concentrate return line 40 from filtration unit 22 leads back into recirculation tank 20.

An acid solution may be prepared in a premixing tank 46 and forced, by pump 44, into permeate neutralization tank 24 to adjust the pH level of the ultrafiltered permeate to the level required for discharge into a POTW or reuse.

Figure 2:
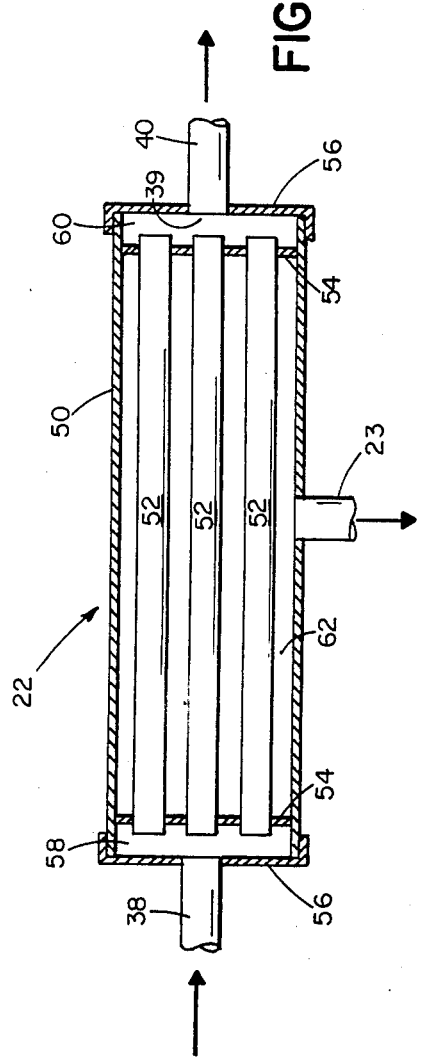
FIG. 2 is a schematic sectional view of portions of the system of FIG. 1.

As shown most clearly in FIG. 2, membrane filtration unit 22 includes a PVC housing 50 in which are mounted a number, typically 10, of coaxial membrane tubes 52. The tubes are supported within the housing by a circular supports 54, each of which includes a number (typically 8) of circumferentially spaced holes and two central holes for supporting and sealingly engaging the exterior of respective one of tubes 52. The outer periphery of each support 54 tightly engages the inner cylindrical surface of housing 50. The two ends of housing 50 are covered by end caps 56, each of which includes a coaxial opening sealingly supporting a respective one of inlet line 38 and outlet line 40. An inlet chamber 58 and an outlet chamber 60 are provided at the opposite ends of housing 50, between the respective end cap 56 and adjacent tube support 54. The open ends of each tube 52 are within the inlet and outlet chambers. Filtrate outlet 23 is provided in the cylindrical wall of housing 50, midway its length.

Each tube 52 of filter unit 22 comprises an inert polymeric anisotropic membrane case onto the inside of a porous tubular support. The effective size of the pores of the membrane depend on the particular material to be removed by the filtration, as is well known in the art. The membranes of the preferred embodiment are manufactured and sold by Memtek Corporation, and have an effective pore size of 0.01 to 0.1 micron. Other membranes useful in the practice of the invention may be obtained from other manufacturers.

As schematically indicated, concentrated water from inlet line 38, pressurized to 20–50 psig by pump 36, flows into inlet chamber 58 and then axially through tubes 52 at high velocity. The filtrate/permeate (i.e., water from which contaminants are being removed) flows radially through the circumferential walls of the membrane tubes 52 into the interior volume 62 of housing 50 and then into filtrate outlet 23. The concentrate (i.e., the remaining water containing the suspended solids which absorb the dissolved contaminants that do not pass through the membrane) flows into outlet chamber 60, and then through outlet 39 into return line 40 through which it is returned to the recirculation tank 20.

According to the present invention, the wastewater is first pretreated to remove contaminants, particularly organic materials such as greases and oils, and minimize later fouling of the ultrafiltration membrane. In particular, coagulation and flocculation of the contaminants are achieved by mixing pre-treatment chemicals with the wastewater in rapid mixing tank 14 and coagulation tank 16; and then permitting the resulting suspension to settle in settling tank 18. It has been found that pre-treatment with hydrated lime at a concentration of between about 1200 and 2400 mg/l (and preferably about 1800 to 2000 mg/l to limit the dissolved calcium to 42 mg/l which corresponds to a hardness of 105 mg/l as $CaCO_3$), or with ferric sulfate in combination with lime at optimum concentrations of about 1000 mg/l lime and 500 mg/l ferric sulfate, provides optimum reduction of suspended solids and total organic carbon (TOC) while at the same time maintaining the level of dissolved calcium in the water at a level sufficiently low to permit some later reuse.

Pretreatment with sulfuric acid (to reduce the pH of the water to 2 or 3 and enhancing flotation of greases and oils which may then be skimmed off) and then with lime also results in good coagulation and TOC values, but the level of dissolved calcium is higher because of the increased solubility of calcium in water of higher acidity.

The results of jar tests using lime alone, lime and ferric sulfate, and sulfuric acid and then lime are set forth in the following Table 2. Results obtained from a pilot plant operation using a system essentially as set forth in FIG. 1 were consistent.

TABLE 2

| Item | Lime Treatment | Lime & Ferric Sulfate | Lime & Sulfuric Acid |
|---|---|---|---|
| Raw Wastewater TOC (mg/l) | 526 | 545 | 545 |
| Settled Wastewater TOC (mg/l) | 208 | 163 | 194 |
| % TOC removed | 60% | 70% | 64% |
| Settled Wastewater Calcium (mg/l) | 42 | 116 | 143 |
| Cost of Treatment ($/1000 gal.) | $0.67 | $0.95 | $0.81 |

In the process of the present invention, contaminant removal and the flux rate across the ultrafiltration membranes in membrane filtration unit 22 are enhanced by adding a particulate filter aid to the water in tank 20 in a sufficient quantity to produce a concentration not less than about of 0.5% filter aid [preferably about 1.0% to 1.5% by weight], and throughly mixing and agitating the particulate material with the water in the tank to prevent settling. The filter aid particles typically have a diameter less than about 100 mesh, but also are sufficiently large to insure that they will not pass through the membrane pores. The membrane pore size, as already indicated, is typically in the range of 0.01 to 0.1 micron; the particulate filter aid material typically should not be less than about 1 micron in diameter. The filter aid particles circulate through the filtration unit in suspension in the contaminated water. Exemplary filter aid materials found useful include a. Bentonite clay (e.g., IGBA brand purchased from Industrial Mineral Ventures, Inc. of Las Vegas, Nev. having a diameter smaller than 200 mesh), b. Activated carbon (e.g., Hydro Darco H brand and T-88 brand, both purchased from ICI Americas, Inc. of Wilmington, Del. and having a diameter smaller than 325 mesh), and c. Lime, all of which increase flux rates and also have the ability to adsorb impurities in the contaminated water.

The results of tests conducted by adding one percent concentrations of lime, bentonite clay and particulate activated carbon (PAC) to the recirculation tank of a system in which wastewater was simply recirculated through a recirculation tank and ultrafiltration unit over a 24 hour period are shown in Table 3, below. As shown in the table, the lowest permeate TOC's were obtained using PAC, but (and especially in view of the significantly lower cost) the bentonite treatment resulted in generally good permeate also. The permeate obtained using lime had too high a calcium concentration to permit reuse of the water. It will also be noted from the table that both bentonite clay and PAC resulted in higher flux levels than did lime; and that the lowest TOC level was obtained using PAC.

TABLE 3

| | LIME | BENTONITE | PAC |
|---|---|---|---|
| TOC (mg/l) | 108 | 102 | 78 |
| FLUX (gfd) | 82 | 145 | 230 |
| CALCIUM (mg/l) | 530 | 180 | 230 |
| TOTAL SOLIDS (mg/l) | 3,200 | 2,120 | 2,280 |
| COST PER POUND ($/lb) | $ .04 | $ .04 | $ .40 |
| COST PER 1000 GALS TREATED ($/1000 g) | $1.56 | $ .88 | $5.60 |

During the continuous recirculation tests upon which Table 2 is based, the TOC levels in the permeate increased gradually with time. For example, an initial TOC value of 20 mg/l increased to about 75 mg/l after 100 hours of operation. Increasing the concentration of particulate activated carbon to 2% improved the permeate TOC levels, reducing them to the range of 20 to 38 mg/l.

It will be noted from Table 2 that the lower TOC levels were obtained using PAC than using lime or bentonite. The effect of particulate activated carbon in reducing TOC was confirmed in batch ultrafiltration tests in which both outlets of the membrane filtration unit were returned to the recirculation tank and all of the wastewater recirculated.

Operation of the pilot plant previously referred to, at system flow rates of between 10 and 40 gallons per minute (corresponding to flux rates of 65 to 260 gfd), resulted in an average flow rate of 20 gallons per minute (130 gfd), with the product water having the representative analysis shown in Table 4, below.

TABLE 4

| PARAMETER: | PILOT PLANT EFFLUENT (mg/l): | TYPICAL RAW WASTEWATER (mg/l): |
|---|---|---|
| Total Organic Carbon (TOC) | 59 | 1,000 |
| Chemical Oxygen Demand | 100 | 3,230 |
| Oil & grease | 7 | 207 |
| Suspended Solids | 13 | 852 |
| Dissolved Solids | 1,310 | 2,264 |
| Copper | none detected | 0.24 |
| Lead | none detected | 0.06 |
| Zinc | none detected | 1.4 |

As shown, over 90% of the total organic impurities were removed, resulting in a typical product TOC of 60 mg/l, suspended solids, color and odor materials were similarly removed, and the final pH was controlled (by adding acid to tank 24 as required) to a range of 8–9.

The system operating costs of the pilot plant totaled $3.80 per 1000 gallons, including particulate activated carbon costs (in the recirculation tank 20) of $2.05, electrical power costs of $1.08 and lime coagulant costs (added in the rapid mixing tank 14) of $0.67.

OTHER EMBODIMENTS

Figure 3:
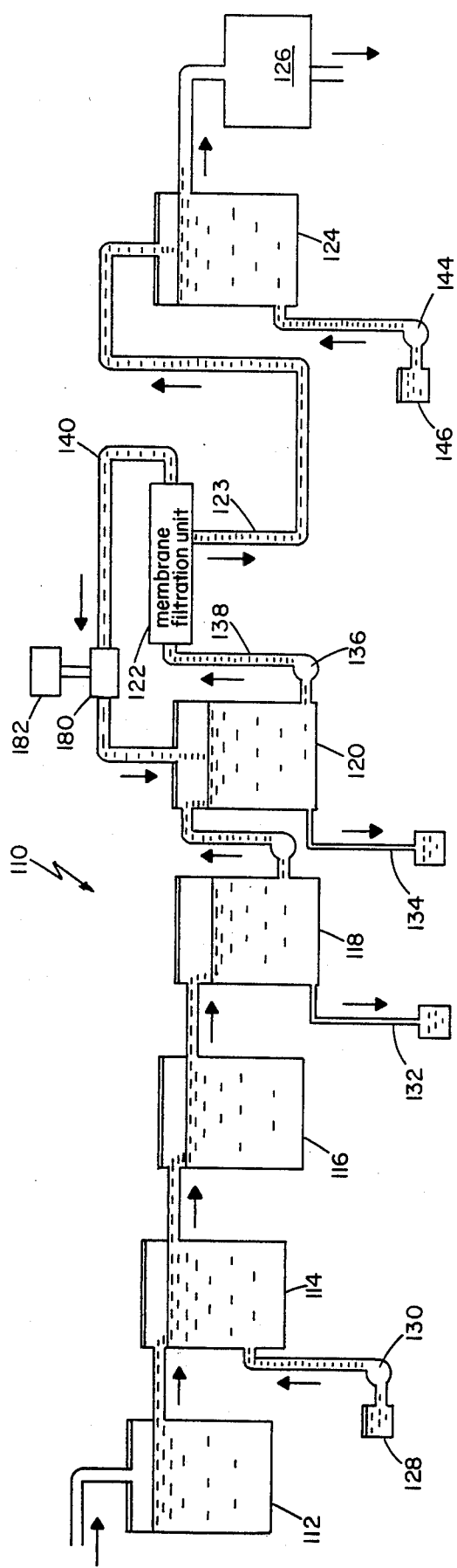
FIG. 3 is a schematic of a modified filtration system also used in the practice of the invention.

As indicated above, the bentonite clay is significantly less expensive than activated carbon, but has similar characteristics as a filter aid. FIG. 3 illustrates a system, generally designated 110, which is designed to use bentonite clay rather than particulate activated carbon in the recirculation tank 120, and which also provides means for significant reductions in the level of dissolved calcium in the final output water. As will be apparent, most of the components of system 110 are essentially identical to corresponding portions of system 10, and are identified by the same reference numbers with a prefix "1" added, e.g., the filtration unit of system 110 is designated 122 while that of system 10 is designated 22.

As shown, system 110 includes a carbon column 126 connected to the outlet from neutralization tank 124. In a pilot system operation, a pair of columns 126 each six inches in diameter, about 10 feet long, and filled with granular activated carbon to a height of about 6 feet, were employed; and bentonite clay at a 1% (wt./wt.) concentration was used in the recirculation tank. The resulting flux levels through the membrane filtration unit 122 ranged from 100 to 350 gfd; and the level of organic compounds in the influent to recirculation tank 120 was reduced about 50% by the ultrafiltration unit, resulting in a permeate (from outlet 123) having TOC values of 100 to 150 mg./l. and a visually evident amount of color. Substantially all, e.g., 99%, of the suspended solids were removed by the ultrafilter.

The color compounds were substantially totally removed, and TOC levels further reduced, by flow through the carbon columns 126. Pilot plant studies resulted in an average 35% removal of adsorbable TOC (resulting in a effluent of approximately 80 mg/l), at a carbon cost of approximately $2.00 per 1000 gallons treated.

To reduce the levels of dissolved calcium in the effluent, in-line mixer 180, connected to a source 182 of carbon dioxide gas, is placed in concentrate return line 140 for injecting carbon dioxide gas into the waste water which will be recirculated to the membrane. The carbon dioxide gas reacts with the wastewater/lime mixture in recirculation tank 120, producing particulate $CaCO_3$ which will not pass through the membrane of the filtration unit 122. The particular rate of carbon dioxide flow depends on the amount of dissolved calcium in the wastewater. Typically, a flow sufficient to reduce the pH of the wastewater to about 10, e.g., a flow of about 4 or 5 cubic feet of carbon dioxide per liter of wastewater, is sufficient to reduce the dissolved calcium to less than 1 mg/l.

As will be evident, the carbon dioxide may be introduced into the system at other points upstream of the membrane filtration unit, e.g., it may be bubbled directly into recirculation tank 120. In the illustrated embodiment, in which the carbon dioxide is introduced into return line 140, i.e., is added to contaminated water that has already passed at least once through filtration unit 122, it is often desirable to add a carbonate (e.g., sodium carbonate) directly to the waste in recirculation tank 120 at the commencement of operation, thereby to precipitate calcium in the wastewater intitially presented to the membrane.

These and other embodiments will be within the scope of the following claims.

What is claimed is:

1. A process for treating wastewater including organic compounds and suspended solids as contaminants, said process comprising the steps of:
    mixing lime with the wastewater at a concentration of not more than about 2400 mg/l;
    permitting the wastewater with the lime mixed therein to settle to precipitate lime with contaminants adsorbed thereon;
    thereafter mixing the settled wastewater with a particulate filter aid material to suspend the filter aid material therein at a concentration (wt/wt) of not less than about 0.05%; and,
    thereafter passing the settled wastewater with the filter aid suspended therein through a membrane filtration unit in which the membrane pores are not less than about an order of magnitude smaller than the diameter of the particles of filter aid material, the filtration unit passing a permeate that is essentially free of suspended solid contaminants, the wastewater including the suspended filter aids being recirculated, and
    including the step of removing organic contaminants by treating the wastewater with activated carbon, whereby the treated water from the system is essentially free from suspended solids, has a TOC level less than about 200 mg/l and a total solids level less than about 2000 mg/l.

2. The process of claim 1 wherein said TOC level is not more than about 100 mg/l.

3. The process of claim 1 wherein said organic compounds are removed by employing said activated carbon as said filter aid.

4. The process of claim 1 wherein said organic compounds are removed by providing passing the output from said filtration unit through a bed of activated carbon.

5. The process of claim 1 wherein said filter aid is bentonite clay.

6. The process of claim 1 including the step of adding carbon dioxide gas to wastewater to be passed to the filtration unit in sufficient concentration to precipitate dissolved calcium therefrom and reduce the level of dissolved calcium in the output from said filtration unit to less than about 1 mg/l.

7. The process of claim 6 wherein said carbon dioxide is added in a concentration sufficient to adjust the pH of wastewater to be presented to said filtration unit to about 10.

8. The process of claim 6 wherein said carbon dioxide is added in a concentration of about 4 to 5 cubic feet of $CO_2$ per liter of wastewater.

9. The process of claim 1 wherein lime is mixed with the wastewater at a concentration of between 1200 and 2400 mg/l.

10. The process of claim 9 wherein said concentration is 1800 to 2000 mg/l.

11. The process of claim 1 wherein lime and ferric sulfate are added to said concentration tank at respective concentrations of about 1000 mg/l lime and 500 mg/l ferric sulfate.

12. The process of claim 1 wherein the concentration of said filter aid is in the range of about 1.0 to 1.5 percent (wt/wt).

* * * * *